United States Patent Office 3,436,006
Patented Apr. 1, 1969

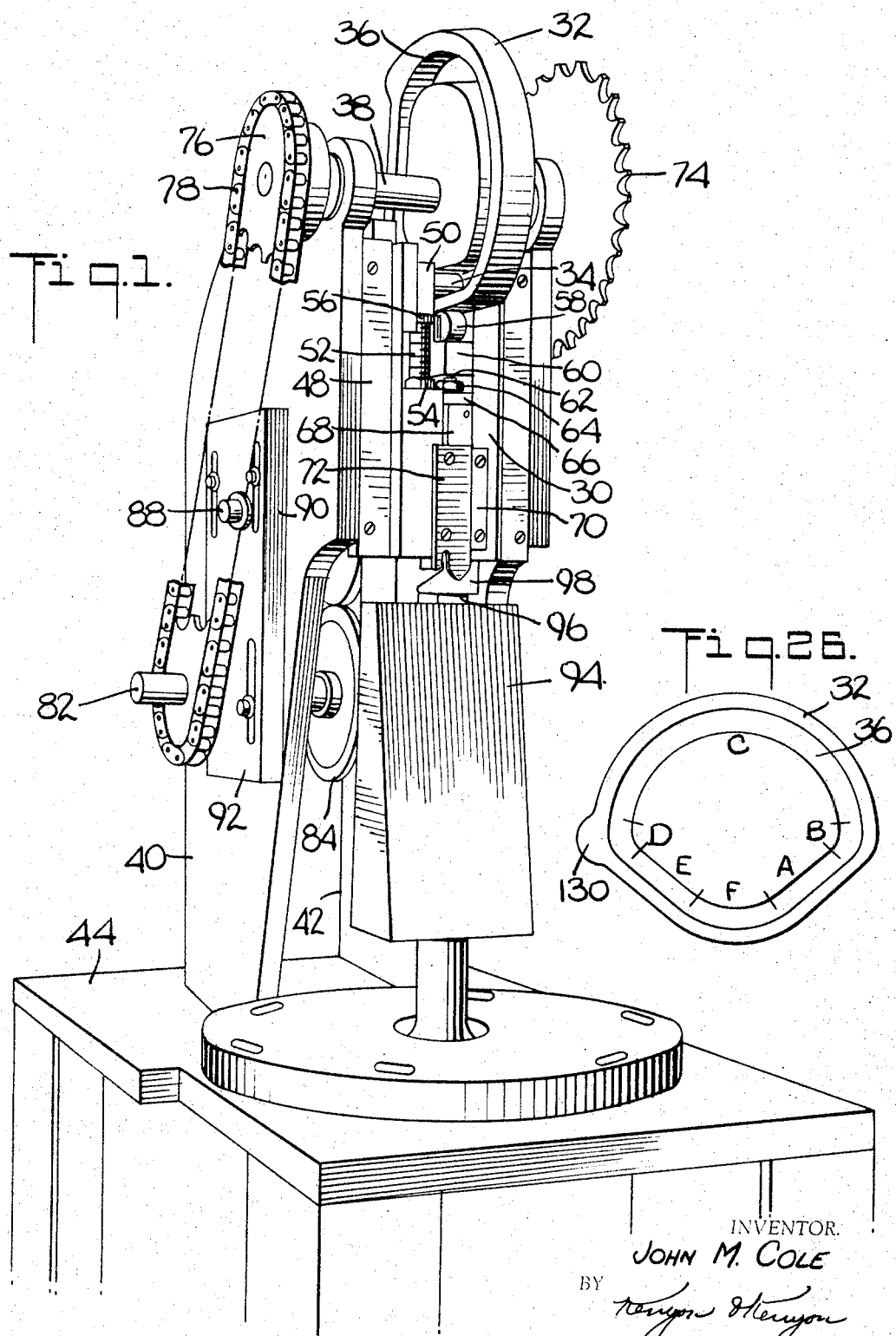

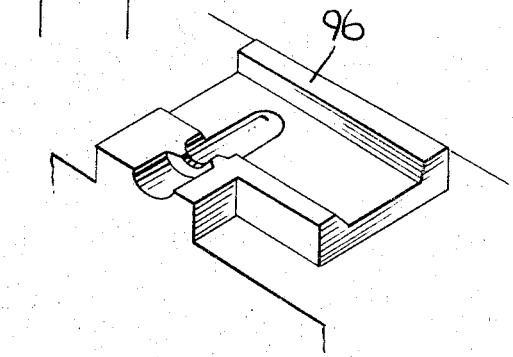
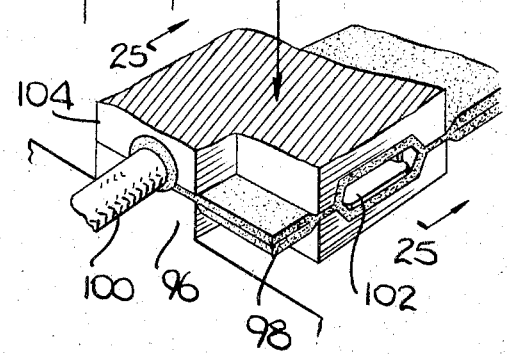
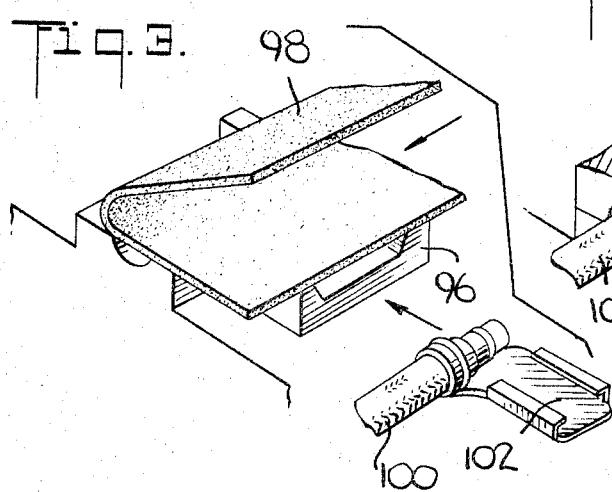
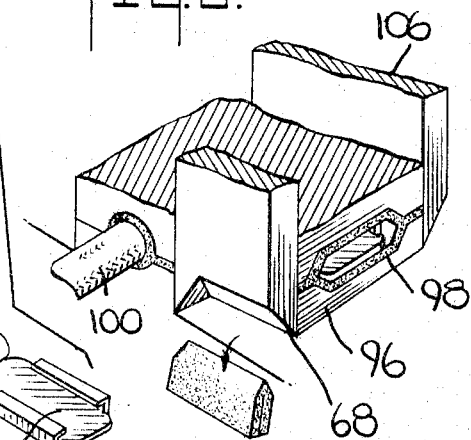
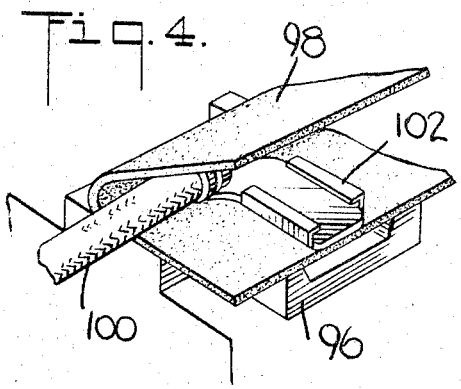
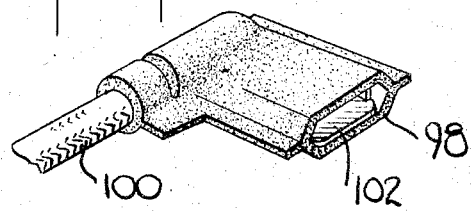

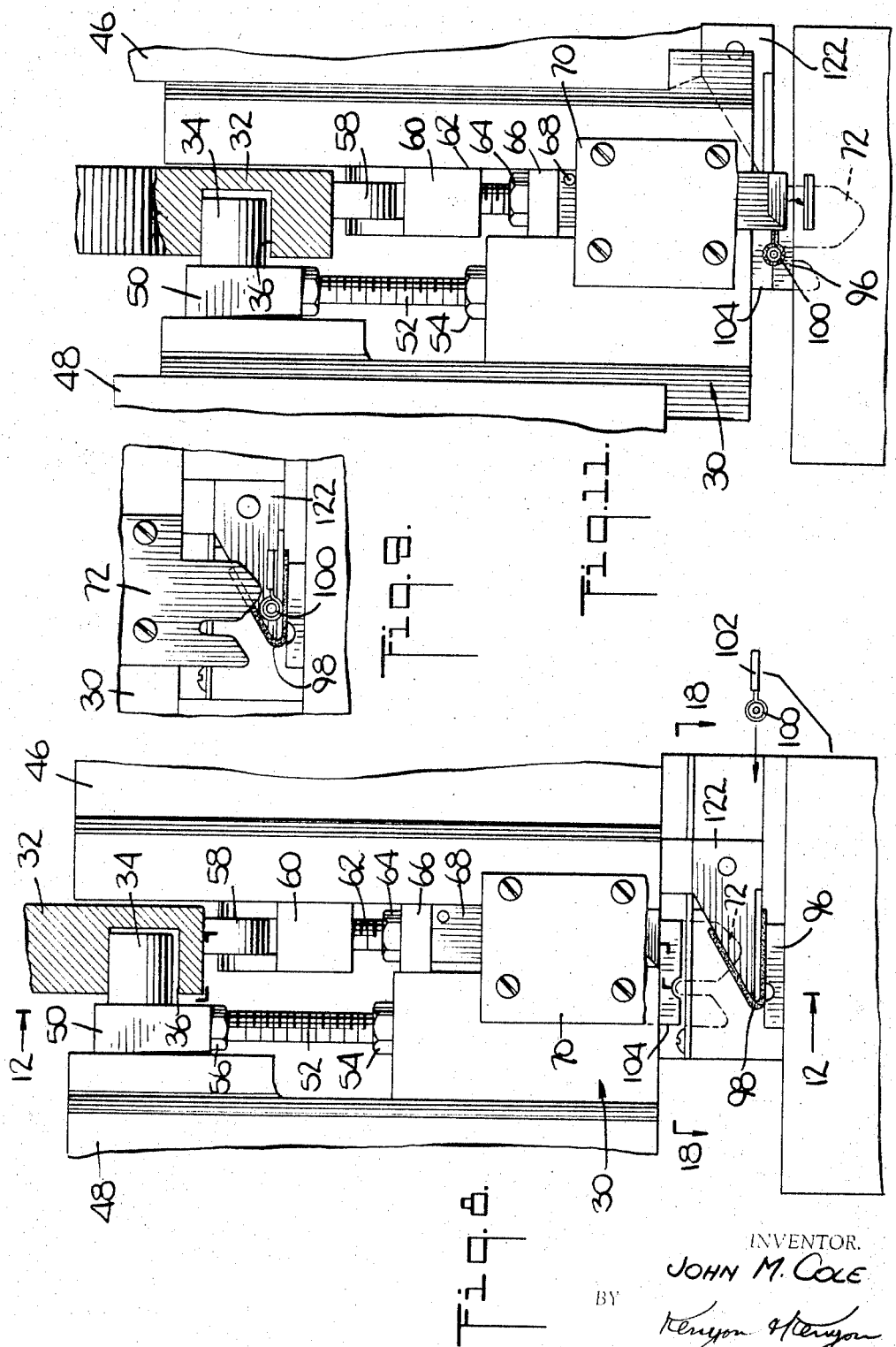

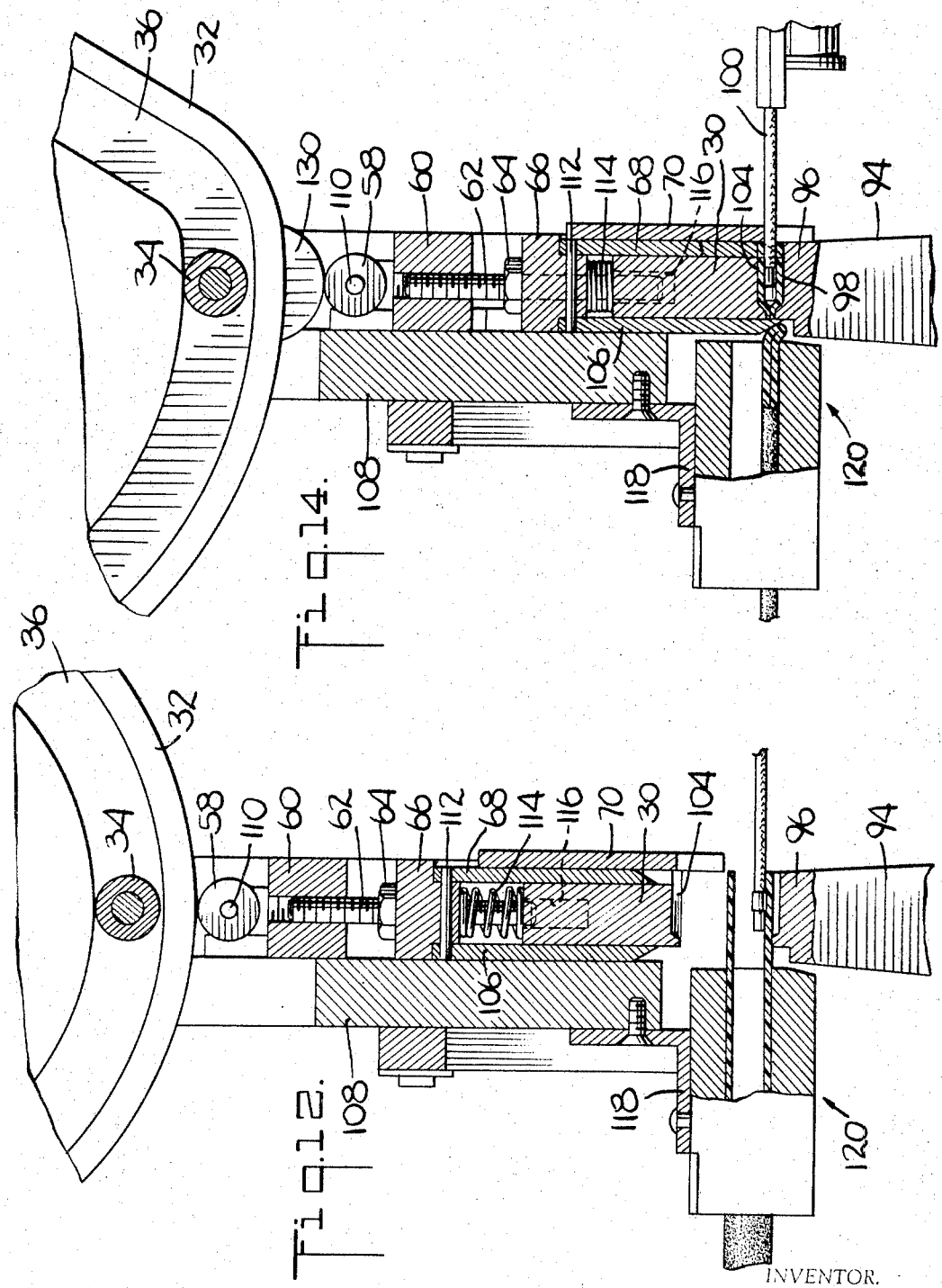

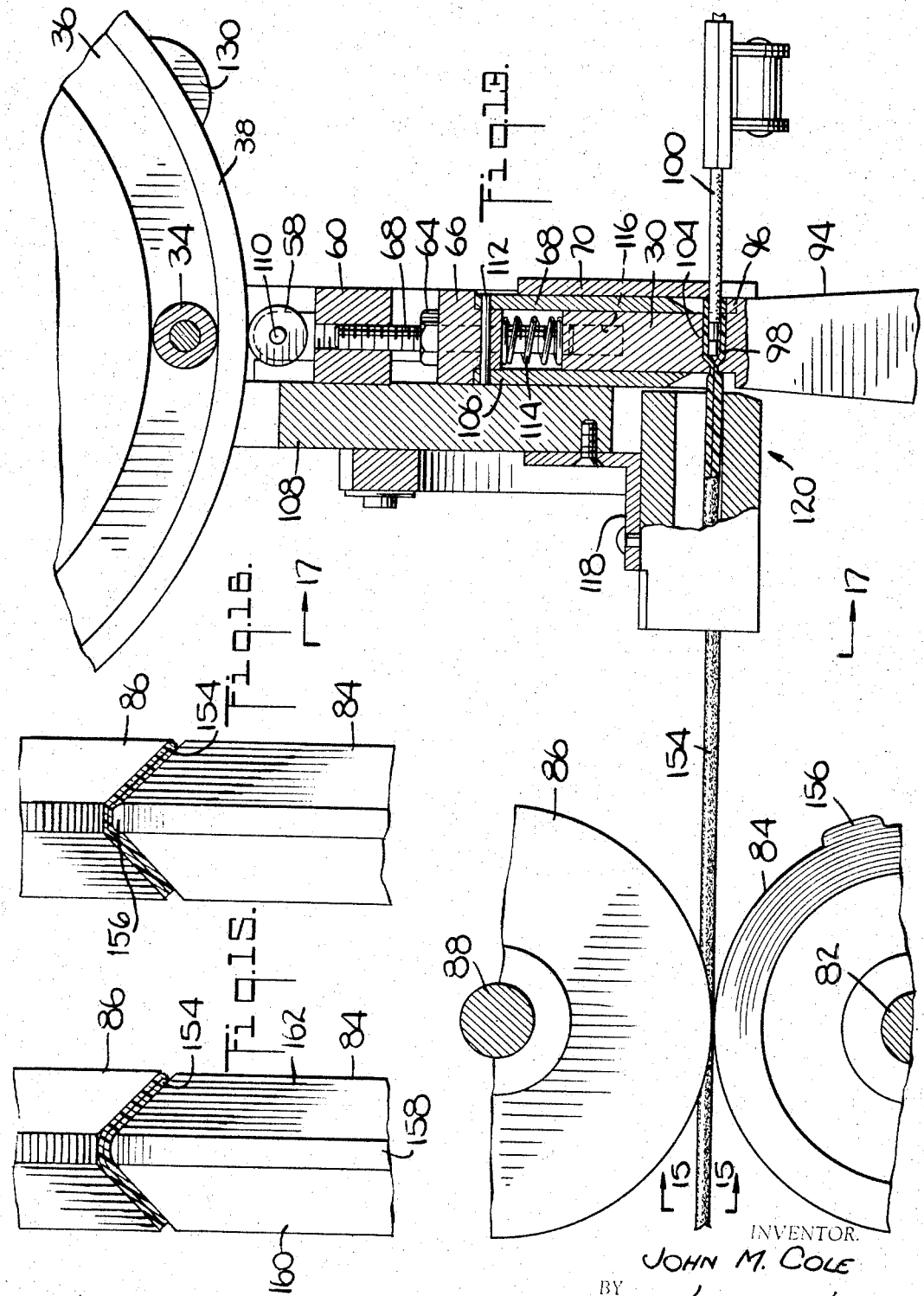

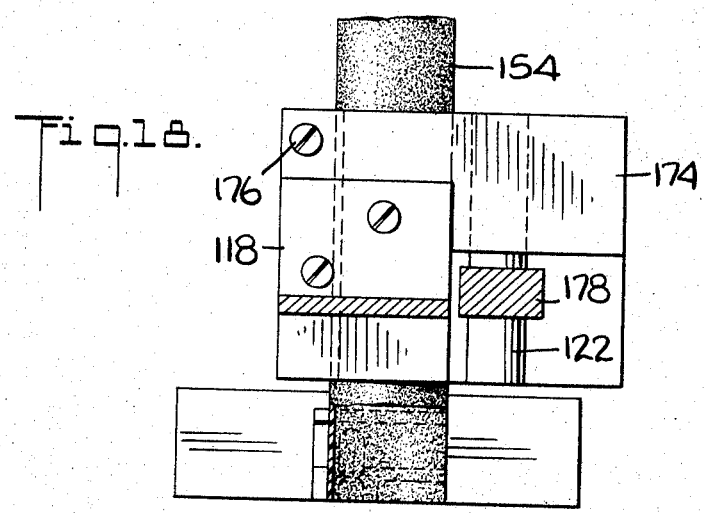
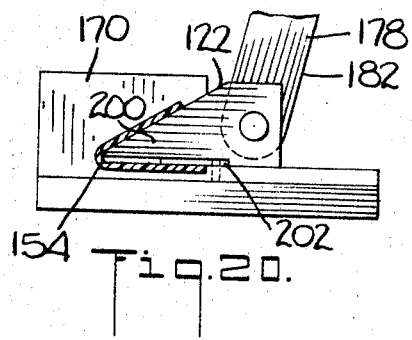
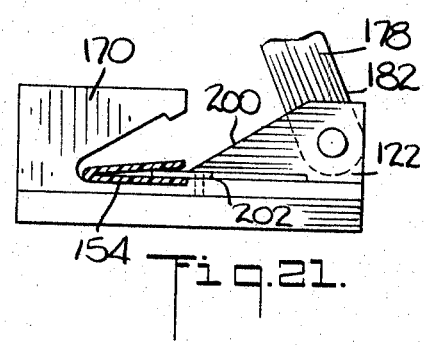
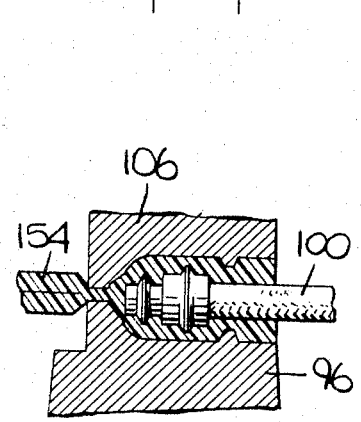
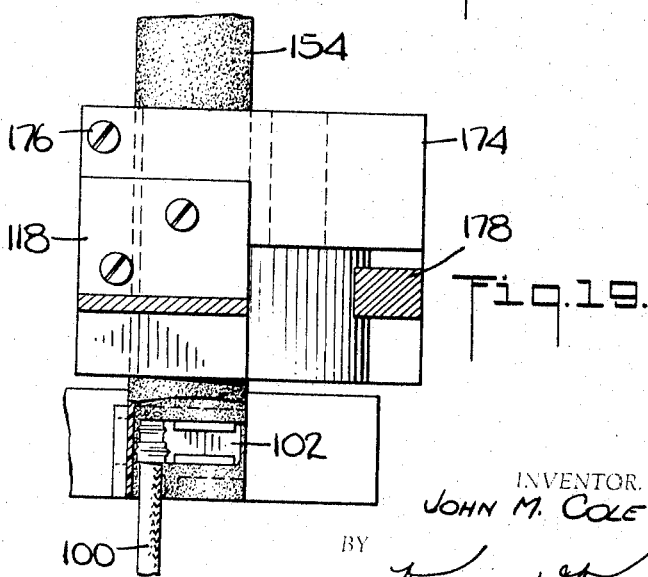

3,436,006
ULTRASONIC WELDING DEVICE
John M. Cole, Highland, N.J., assignor to Thomas & Betts Corporation, Elizabeth, N.J., a corporation of New Jersey
Filed June 22, 1965, Ser. No. 465,994
Int. Cl. B23k 5/20, 1/06
U.S. Cl. 228—1          13 Claims

ABSTRACT OF THE DISCLOSURE

An ultrasonic welding device for welding insulation material about at least a portion of an electrical terminal by means of ultrasonic energy. In a preferred form, the ultrasonic welding device comprises roll means for feeding an elongated continuous strip of insulation material to a welding station, spreader means for spreading the insulation open at said station in order that an electrical terminal may be positioned within the end of the strip of insulation material at said welding station, reciprocatable ram means positioned at said welding station for applying pressure to the insulation in order to form it about at least a portion of the terminal, ultrasonic welding means operating in conjunction with said ram means to weld said insulation material by means of ultrasonic energy, knife means for severing the welded insulation from the remainder of the continuous strip of insulation, and drive means for causing the ram means to reciprocate and for causing said roll means to feed insulation strip forward to said welding station.

---

This invention relates to a new and improved device for welding insulation to the terminals of conductors and more particularly to a new and improved ultrasonic welding device for welding insulation to the terminals of insulated conductors.

After a terminal has been attached to an electrical conductor, it is often desired to insulate the terminal itself. Previous methods for applying the insulation to the terminal have been disadvantageous in that they are slow or involve a number of expensive steps. One such method involves the use of a multiconductor mold. Terminated leads are placed on mandrels within the mold and plastic insulating material fed to the mold dies. After the plastic material has cured about the individual terminals forming hard plastic insulation, the leads are removed and other terminated leads are placed within the mold. Although this procedure possesses the advantage of being able to orient a number of terminals within the mold, the cure time of the plastic material is relatively long, thus preventing the use of such a method with a high-speed wire terminating machine. Another method of applying insulation to the terminal of an electrical conductor involves slipping a tube of vinyl or similar plastic material over the terminal and crimping the plastic tube onto the electrical conductor. Such a method is slow and requires hand assembly. A similar method utilizes snap-on type insulators which are slipped onto the terminal and are permanently snapped into place by means of a locking device or the like provided on the insulation. A further method involves slipping a piece of plastic tubing onto the terminal and then heat shrinking the plastic around the terminal for permanent attachment thereto. Both of these methods suffer from the disadvantage of being slow. In addition, it has been found difficult to adapt any of these methods for use with a high speed automatic wire handling and terminal attaching machine.

According to the present invention, a simple and efficient device has been developed that may be synchronized with an automatic terminal attaching machine whereby terminals may be insulated in a simple and efficient manner and with great speed. According to the present invention, an ultrasonic welding device is provided to weld suitable insulation onto a terminal positioned within the welding device. The ultrasonic welding device of the present invention, in its preferred form, consists of roll means to feed a strip of insulation material forward, spreader means for spreading the insulation open so that a terminal may be positioned within the strip of insulation, ram means for applying pressure to the insulation such that the insulation is formed about the terminal, ultrasonic welding means operating in conjunction with said ram means to weld said plastic insulation about said terminal, knife means for severing the insulation welded about said terminal from the strip of insulation, and drive means for causing said ram to descend and ascend and to cause said roll means to feed the insulation strip forward. Insertion of a terminal within the plastic strip at the welding station may be accomplished either by hand or by a mechanical transfer device. The mechanical transfer device is preferably operated in synchronism with the welding device and may also be synchronized with a terminal attaching machine. In such case, the drive means of the welding device is also operated in synchronism with the terminal attaching machine. The ultrasonic welding device of the present invention provides for quick application of insulation to terminals and is readily adapted to be operated with an automatic wire handling and terminal attaching machine such that no hand assembly or manual operation need take place between the time that a wire is stripped of its insulation before a terminal is attached to the end thereof, until after the insulation has been applied to the terminal. None of the previous insulation applying techniques have been found suitable for such rapid and automatic operation.

It is thus an object of the present invention to provide a device for applying insulation to the terminal of an electrical conductor in a simple and efficient manner.

It is a further object of the present invention to provide a device for applying insulation to a terminal of an electrical conductor that is capable of insulating a large number of terminals and which may be synchronized with a terminal attaching machine to insulate the terminals automatically.

It is a further object of the present invention to provide a new and efficient method for applying insulation to terminals of electrical conductors.

Other and further objects of this invention will become apparent from the description to be given hereinafter and the following figures, wherein:

FIG. 1 is a front perspective view of a preferred embodiment of the present invention;

FIG. 2 is a partial perspective view of an ultrasonic transducer die for applying insulation to one type of terminal;

FIG. 3 is a partial perspective view showing the die of FIG. 2 having an extrusion of insulation resting on it and a terminated electrical conductor before insertion into the extrusion;

FIG. 4 is a partial perspective view of the terminal and insulation of FIG. 3 with the terminal lead resting on the transducer within the insulation;

FIG. 5 is a partially sectional perspective view of the terminated lead and insulation of FIG. 4 during the ultrasonic welding operation;

FIG. 6 is a partially sectional perspective view showing knives removing excess insulation material from the insulated terminal;

FIG. 7 is a partial perspective view of an insulated terminal;

FIG. 8 is a partially sectional elevational front view of the ram and spreader mechanisms;

FIG. 9 is a partially sectional elevational view of the wire positioner and spreader mechanisms;

FIG. 11 is a partially sectional front elevational view of the ram and spreader of FIG. 8 showing the ram in its lowest position with knives extended;

FIG. 12 is a partially sectional elevational view taken along lines 12—12 of FIG. 8;

FIG. 13 is a partially sectional side elevational view showing details of the ram and associated mechanism, the ram being in its lowest position with knives retracted;

FIG. 14 is a partially sectional side elevational view of the ram of FIG. 13 showing the knives extended;

FIG. 15 is a partially sectional elevational view of the feed rolls taken along lines 15—15 of FIG. 13;

FIG. 16 is a partially sectional elevational view of the feed rolls of FIG. 15 showing the raised segment of the lower roll in contact with the insulation strip;

FIG. 18 is a partially sectional plan view taken along lines 18—18 of FIG. 8;

FIG. 19 is a partially sectional top plan view of the spreader of FIG. 18 showing the spreader in its retracted position;

FIG. 20 is a partially sectional side elevational view showing the spreader in its extended position;

FIG. 21 is a partially sectional side elevational view of the spreader of FIG. 20 showing the spreader in its retracted position;

FIG. 25 is a partially sectional elevational view of the transducer die and anvil tip; and FIG. 26 is an elevational view of the grooved face of the cam.

Figure 10:
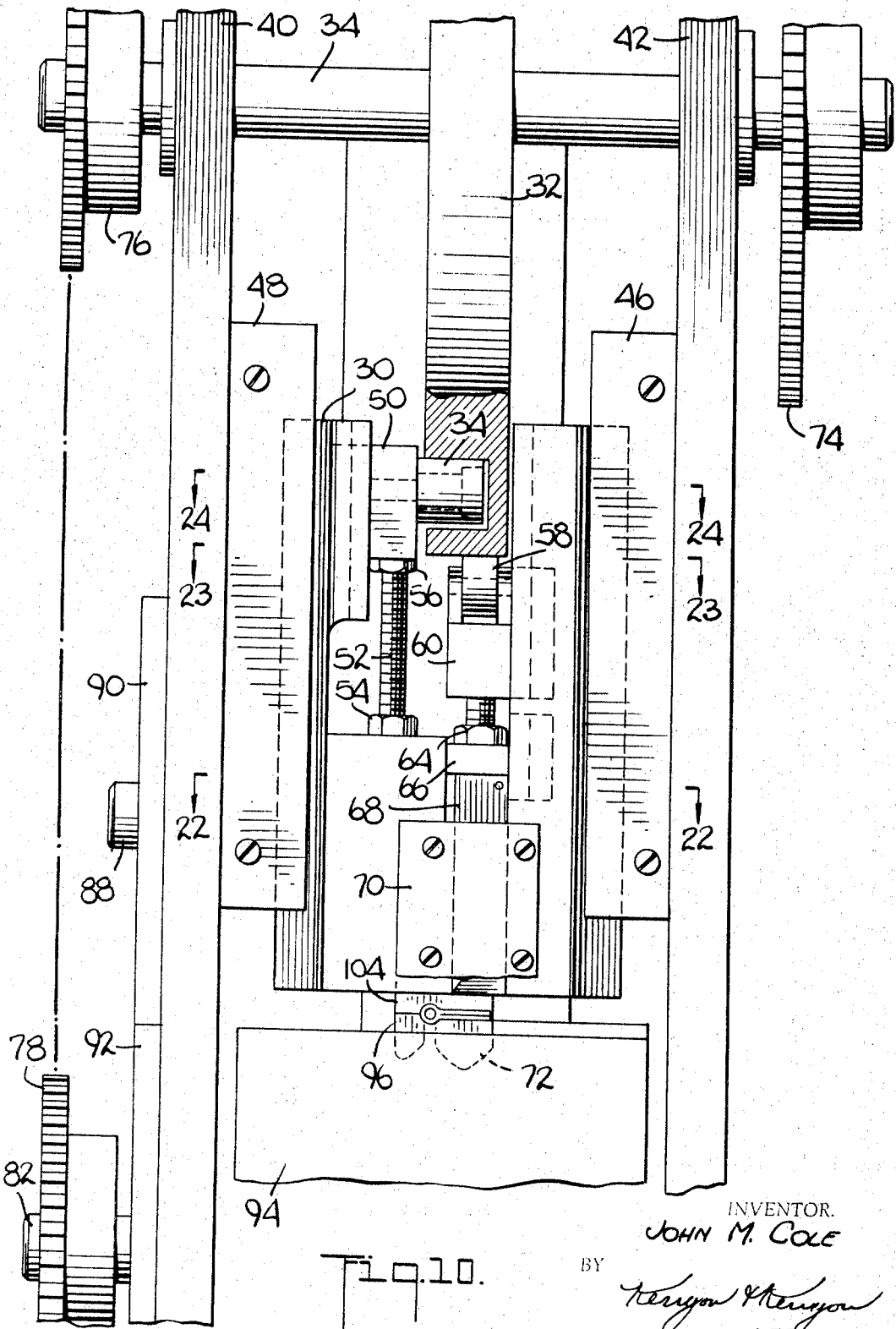
FIG. 10 is a partially sectional front elevational view of the ultrasonic welding device of FIG. 1.

Referring now to the figures, FIG. 1 shows a front elevational perspective view of a preferred embodiment of the ultrasonic welding device of the present invention. As shown, the device consists of a ram 30 linked to drive cam 32 by means of cam roller 34 which is adapted to ride in groove 36 of drive cam 32. Drive cam 32 is mounted on shaft 38 journalled in upright supports 40 and 42. Upright supports 40 and 42 are mounted on base plate 44 by suitable connectors such as screws or the like. Ram 30 is adapted to be slidably mounted between supports 40 and 42 by means of dovetail rails 46 and 48 and a ram mounting plate to be described hereinafter. As shown, cam follower 34 is adjustably mounted on ram 30 by means of cam mounting block 50 which is supported by screw 52 screwed into ram 30. Adjustable nuts 54 and 56 allow for upward and downward adjustment of cam follower 34 relative to ram 30. Also mounted on ram 30 is cam roller 58 mounted on cam roller mounting block 60. Mounting block 60 is adjustably mounted on ram 30 by means of screw 62 and nut 64. Adjustment of nut 64 adjusts the relative vertical position of cam roller 58. Screw 62 is threaded into a knife mounting block 66 which mountably supports two knives, one of which is shown as 68, and both of which will be described in greater detail hereinafter.

A retaining plate 70 is provided on ram 30 to retain knife 68 whithin its slidway in ram 30. A wire positioner 72 is provided on ram 30 to position wires fed along a transfer device to be positioned at the welding station. Also shown in FIG. 1 is drive sprocket 74 mounted on shaft 38. Also mounted on shaft 38 is sprocket 76 which engages with drive chain 78. Drive chain 78 further engages a sprocket 80 mounted on shaft 82. Shaft 82 is also provided with a feed roll 84 which is driven by drive chain 78. Also shown is feed roll 86, the purposes of which will be explained hereinafter. Feed roll 186 is shown as mounted on a shaft 88, supported in adjustable plate 90 and a second plate not shown. Shaft 82 is mounted in adjustable plate 92 and a second adjustable plate not shown.

Also shown in FIG 1 is the feed horn 94 of an ultrasonic generator. Feed horn 94 is terminated by transducer tip 96. Spreader 98 is also shown in FIG. 1 and will be described in greater detail hereinafter.

Referring now to FIGS. 2–7, there is shown in partial perspective view the various steps in the welding operation of the present invention. Thus, in FIG. 2 is shown in perspective view, a detail of one form of transducer tip that may be used to weld plastic insulation onto a "flag" type terminal. Transducer tip 96 is adapted to mate with an anvil tip mounted on ram 30. Transducer tip 96 may be of any suitable shape, depending upon the type of terminal that insulation is to be welded onto. As shown in FIG. 3, a U-shaped strip of plastic insulation has been fed onto transducer tip 96, and a terminated electrical conductor 100 with terminal 102 is shown being transferred from the right to the welding station. FIG. 4 shows terminated conductor 100 with terminal 102 positioned within plastic insulation 98 on top of transducer tip 96.

Referring now to FIG. 5, anvil tip 104 mounted on ram 30 (not shown) has descended to apply pressure to plastic insulation 98 and thus mold plastic insulation 98 about conductor 100 and terminal 102. While pressure is applied to insulation 98, transducer tip 96 is vibrated by ultrasonic generator 94 to create heat which forces the thermoplastic to weld together at the point where transducer tip 96 and anvil tip 104 apply presure to plastic insulation 98.

Ultrasonic generator 94 may be any suitable device that produces ultrasonic energy for vibration of transducer tip 96 at ultrasonic frequencies, i.e., frequencies in the range above audibility. Such a generator may, for example, comprise a frequency generator, a powerful control amplifier having frequency, gain and phase control for amplifying and controlling the signals produced by the generator, a coupling transformer for coupling the electrical energy from the control amplifier with the ultrasonic transducer and a transducer which is caused to mechanically vibrate at ultrasonic frequencies by the application of electrical energy of ultrasonic frequency. Due to the heat dissipated by the transducer, it is preferably mounted in a water-cooled oil jacket.

The pressure to be applied during the welding operation is dependent upon the total area to be welded, the thickness of the material to be welded, the length of time that the pressure is applied, the frequency at which the ultrasonic transducer is operating and the amplitude of the ultrasonic generator power. For a proper weld, however, the pressure should be applied gradually, rather than abruptly, so as not to dampen the activity of the transducer tip before it has heated the plastic insulation.

Referring now to FIG. 6 knives 68 and 106 are shown severing plastic insulation 98 from the plastic strip and cutting away excess insulation. FIG. 7 shows the insulated terminal after removal from the welding station. As shown in FIG. 7, one side of flag terminal 102 has not been covered with insulation in order to allow insertion of a suitable connector into terminal 102.

Referring now to FIGS. 8–14, there is shown in greater detail the interrelationship of ram 30, cam 32, and knife 68. As shown in FIGS. 8 and 12, ram 30 is shown in its uppermost position. Thus, cam follower 34 is shown positioned in groove 36 of cam 32 in the curved segment C of groove 36 (FIG. 26). Curved segment C forms a semicircle having its center at shaft 38. As shown more clearly in FIG. 12, ram 30 is further held in vertical position by ram mounting plate 108. Knife roller 58 is shown mounted on knife roller mounting block 60 by means of pinion 110. Both cam roller mounting block 60 and knife mounting block 66 are threaded onto screw 62. Knives 68 and 106 are mounted on block 66 by means of fasteners 112. Blocks 60 and 66 are fixedly spaced from one another by screw 62 but the spacing may be varied by adjustment of nut 64. Mounting block 66 is spaced from the upper surface of ram 30 by means of helical spring 114. Screw 62 is adapted to be slidably mounted in hole 116 drilled in cam 30. Mounted on ram retaining plate 108 by means of angle bracket 118 is an insulation spreader mechanism generally denoted by 120, hereinafter to be described in greater detail. Spreader mechanism 120 is adapted to spread open plastic insulation to be welded onto a terminated electrical conductor. Spreader 122 of spreader mechanism 120 is shown in FIGS. 8 and 9 in its extended position spreading open insulation 98. As shown in FIG. 8, conductor 100 with terminal 102 is being advanced towards the welding station of the ultrasonic welding device with ram 30 in its uppermost position. In FIG. 9, the conductor 100 has been advanced to the welding station and is shown positioned within insulation 98. During the advance of conductor 100 to the welding station, cam 32 is continuously rotating and operating in synchronism with the transfer mechanism. As ram 30 descends, wire positioner 72 will position electrical conductor 100 correctly for the welding operation. Thus, if the lead is off center, one of the leading edges of wire positioner 72 will contact the upper surface of conductor 100, moving it in a horizontal plane until conductor 100 is positioned directly over transducer tip 96.

As follower 34 continues to travel in groove 36 of cam 32 along segment A of groove 36, a point is reached where the ram is in its lowermost position. This is shown most clearly in FIGS. 10 and 13. When roller 34 has reached segment B on groove 36 of cam 32, the anvil tip 104, in cooperation with transducer tip 96, will have forced insulation 98 about terminal 102 and conductor 100, according to the die configuration of tips 96 and 104. As cam 32 continues to rotate causing cam follower 34 to follow in segment C of groove 36, ram 30 will be maintained in the down position. As shown in FIG. 26, follower 34 follows in segment C of groove 36 of cam 32 for approximately one-half of a complete cycle of cam 32. This provides for sufficient weld time with the force exerted by ram 30 on insulation 98 to insure a proper weld of insulation about the terminal 102. When cam follower 34 has reached segment D of groove 36, knife cam boss 130 on the periphery of cam 32 will engage knife roller 58, thus causing knives 68 and 106 to descend. This is shown most clearly in FIGS. 11 and 14. As noted hereinabove, FIG. 6 shows knife 106 severing insulation 98 from the roll of insulation and knife 68 notching out a piece of insulation. Knife cam boss 130 is so formed that it causes knives 68 and 106 to descend rapidly against the spring pressure of spring 114, thus compressing spring 114. When cam 32 has rotated boss 130 away from engagement with knife roller 58, compressed spring 114 will cause knife mounting block 66 to rise rapidly, causing the knives 68 and 106, with their associated mounting blocks, etc., to assume the position shown in FIG. 13. As cam 32 continues to rotate, follower 34 traverses segment E of groove 36, causing ram 30 to ascend. When roller 34 has reached segment F of groove 36, ram 30 will have been returned to its uppermost position as shown in FIG. 8. Further rotation of cam 32 will repeat this cycle of operation.

Figure 24:
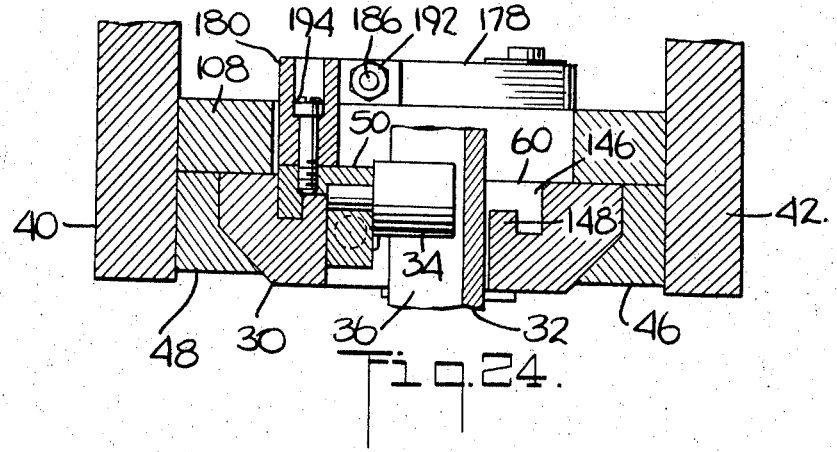
FIG. 24 is a partially sectional top plan view taken along lines 24—24 of FIG. 10.
Figure 23:
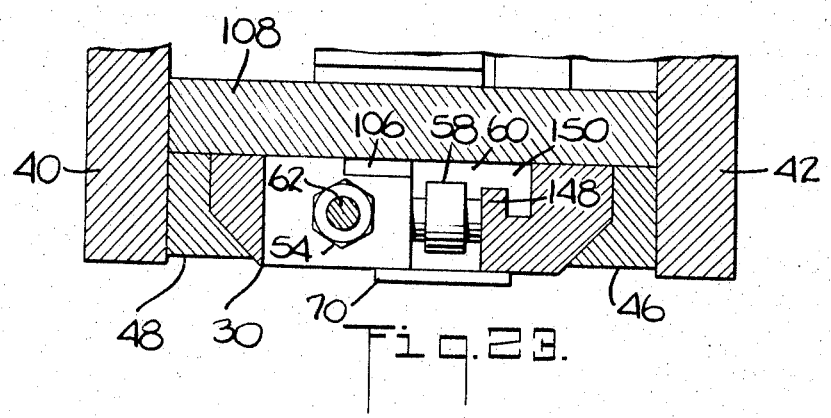
FIG. 23 is a partially sectional top plan view taken along lines 23—23 of FIG. 10.
Figure 22:
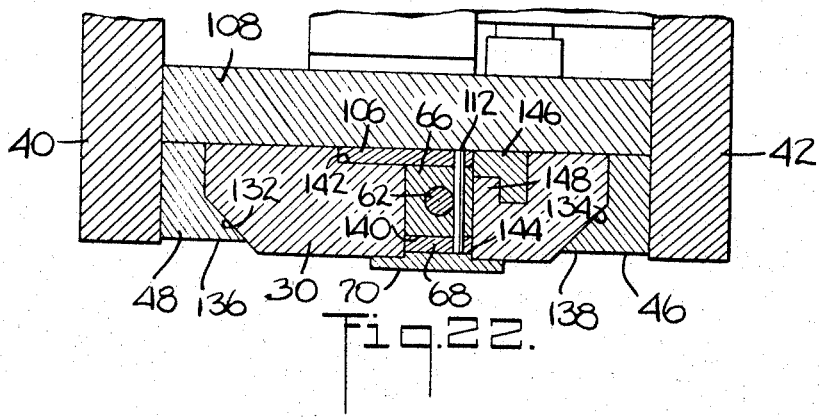
FIG. 22 is a partially sectional top plan view taken along lines 22—22 of FIG. 10.

Referring now to FIGS. 22, 23, and 24, there is shown more clearly in plan cross-sectional views the positioning of the cam follower and knife assembly mounted on ram 30. As shown in FIG. 22, ram 30 has angled surfaces 132 and 134 which engage with triangularly shaped segments 136 and 138, respectively, of rails 48 and 46. Although not shown, it is preferable that the surfaces of segments 136 and 138 engaging with surfaces 132 and 134 of ram 30 be slotted in order to provide frictionless engagement between these respective surfaces. Knives 68 and 106 are adapted to be mounted respectively within slots 140 and 142 of ram 30. Knife retaining plate 70 has a segment 144 which is adapted to be positioned within slot 140. Knife mounting plate 66 has a portion 146 keyed to rail 148 of ram 30. Referring to FIG. 23, knife roller mounting block 60 is shown to have an L-shaped portion 150 which is also keyed to rail 148 of ram 30.

Referring now to FIGS. 15–21, and further to FIG. 13, there is shown in more detail the insulation feed and spreader mechanisms of the preferred embodiment of the present invention. A strip of insulation 154 is positioned between feed rolls 84 and 86. As hereinabove described, roll 84 is mounted on shaft 82 which is driven in synchronism with cam 32. Feed roll 86 is mounted on a shaft 88 and acts as an idler roll. Driven feed roll 84 is further provided with a raised segment 156. As shown more clearly in FIGS. 15 and 16, feed roll 84 has a periphery comprised of thin rim portion 158, and bevelled side walls 160 and 162, the cross-sectional shape of the periphery of roll 84 being approximately convexly V-shaped. Feed roll 86 is provided with a generally V-shaped concave outer rim having a configuration that is generally complementary to the convex rim of roll 84. Rolls 84 and 86 are spaced sufficiently apart so that insulation strip 154 is free to float between the complementary peripheries thereof, during the greater part of a revolution of roll 84. However, when raised segment 156 on roll 84 comes into contact with the lower surface of insulation strip 154, it forces strip 154 into frictional contact with roll 86, causing roll 86 to rotate with roll 84 and thereby drive strip 154 forward a predetermined distance. This predetermined distance of feed of insulation 154 by rolls 84 and 86 is equal to the length of insulation necessary for welding onto the terminal of each electrical conductor.

Figure 17:
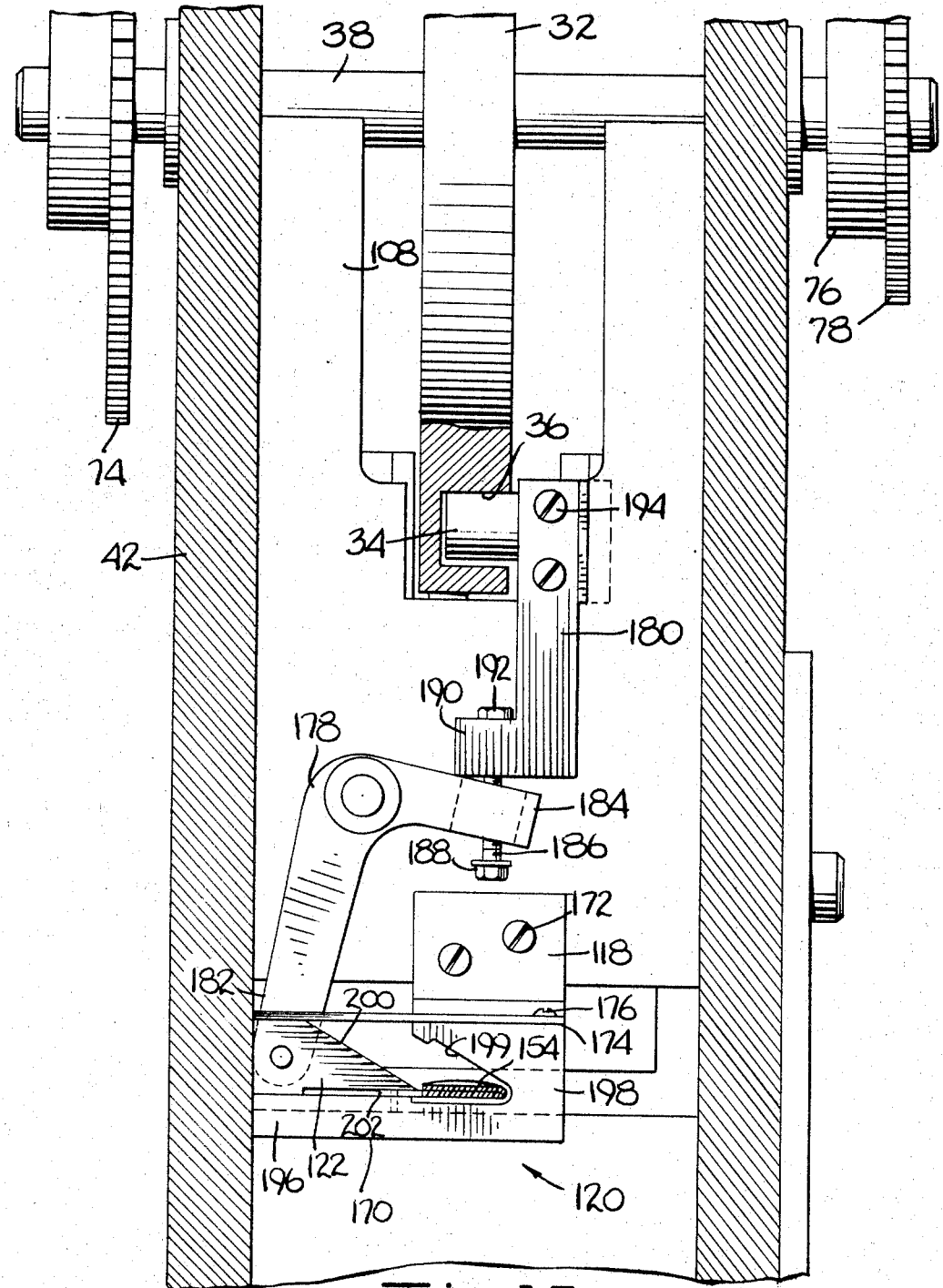
FIG. 17 is a partially sectional rear elevational view taken along lines 17—17 of FIG. 13.

Referring now to FIG. 17, there is shown a rear view of ram 30. Insulation spreader 122 is shown mounted on guide block 170 which in turn is mounted on ram retaining plate 108 by angle bracket 118 by means of suitable screws 172 or the like. Insulation hold-down plate 174 is mounted on guide block 170 by a suitable fastening device such as screw 176 or the like. Spreader 122 is adapted to slide in a horizontal direction between holddown plate 174 and guide block 170. Spreader 122 is driven in a horizontal direction by means of a linkage consisting of spreader lever 178 which is pivotally journalled to ram retaining plate 108, and a spreader bar 180. Lever 178 has one of its legs journalled to spreader 122 and a second leg 184 which is slotted and adapted to receive a screw 186 having a head 188. Screw 186 is threaded through arm 190 of bar 180, and connected thereto by means of a suitable nut 192. As shown more clearly in FIG. 24, bar 180 is affixed to cam roller mounting block 50 by means of suitable screws 194.

Guide block 170 comprises a planar table-like portion 196 over which spreader 122 is adapted to slide, and a guide portion 198 adapted to receive insulation strip 154. Guide portion 198 of guide block 170 has a channel 199 which runs the length of block 170 and which opens towards spreader 122. Channel 199 is adapted to receive wedge-shaped portion 200 of spreader 122. Guide block 170 is further provided with a rail 202 running the length of channel 170 and spaced from the lower surface thereof. Rail 202 acts to separate the legs of U-shaped insulation strip 154 and to position strip 154 for the spreading operation. As shown in FIG. 17, spreader 122 is in its retracted position with the ram in its lowermost position during the welding cycle. Wedge-shaped portion 200 is out of contact with insulation strip 154, and strip 154 is closed about a terminal to which insulation is being welded. In this position, spreader bar 180 bears on the upper surface of arm 184 of spreader lever 178.

Referring now to FIGS. 18 and 19, there is shown in greater detail the interrelationship of the various elements of the spreader linkage. As shown, holddown 174 is L-shaped and extends over a portion of the length of spreader 122. Spreader lever 178 is journalled in spreader 122. Spreader 122 and guide block 170 are adapted to extend beneath ram retaining plate 108 substantially the width thereof. This is shown more clearly in FIGS. 12, 13, and 14. This allows for positive control of the spreading of insulation strip 154 such that the insulation will be consistently spread sufficiently open to permit insertion of a terminal therein.

The operation of spreader 120 during one complete operating cycle of the ultrasonic welding device is as follows:

When ram 30 is in its uppermost position, spreader bar 180 is also in its uppermost position and head 188 of screw 186 bears against the lower surface of arm 184 of lever 178. In this position, spreader 122 is in the extended position, acting on insulation strip 154 to maintain it open. This is shown in FIGS. 8, 9, 12, 18 and 20. As ram 30 descends, arm 190 of bar 180 bears against the upper surface of arm 184, causing lever 178 to withdraw spreader 122 from contact with insulation strip 154. When ram 30 has reached its lowermost position, spreader 122 is completely retracted out of contact with strip 154. This is shown in FIGS. 13, 14, 17, 19 and 21.

After the welding operation is completed, ram 30 will be caused to ascend. As ram 30 ascends, the pressure of arm 190 on lever 178 is released and head 188 of screw 186 bears against the lower surface of arm 184 of lever 178, causing lever 178 to pivot about its axis, and in turn causing spreader 122 to come in contact with insulation strip 154. As ram 30 reaches its uppermost position, spreader 122 acts to open up strip 154 for insertion of a terminated lead in the end thereof. This operation of the spreader mechanism will be repeated as ram 30 is caused to ascend and descend during the weld cycle.

In general, the operation of the ultrasonic welding device is as follows:

A strip of plastic insulation material wound up on a reel or the like, said insulation material being preferably of a thermoplastic composition such as vinyl, is fed between feed rolls 84 and 86 to spreader mechanism 120. Since the insulation strip is U-shaped having a slit along one side, the lower leg of the insulation strip is threaded between the lower surface of V-shaped channel 199 in guide block 170 and rail 202. The insulation strip is fed forward a predetermined amount by the feed rolls once every cycle of drive cam 32, since feed roll 84 is driven in synchronism with cam 32. At the same time that insulation is being fed forward, a terminated electrical conductor is being transported to the welding station formed by transducer tip 96 and anvil tip 106. Both these operations take place during the upward movement of ram 30. As insulation is fed forward during the upward movement of ram 30, spreader 122 is moved horizontally by the spreader linkage connected to ram 30 such as to spread open the U-shaped insulation for easy insertion of a terminated electrical conductor.

When ram 30 has ascended to its uppermost position, spreader 122 will have opened the insulation strip to its greatest height and a terminated electrical conductor will have been positioned within the end portion of the insulation strip at the welding station. The terminated electrical conductor is now ready for the welding operation. As cam 32 continues to rotate, ram 30 will be driven downwardly by means of the action of the sides of cam groove 36 on cam follower 34 which is fixedly mounted on ram 30. As ram 30 descends, wire positioner 72 accurately positions the terminated wire conductor so as to align it with the die faces of anvil tip 106 and transducer tip 96. Further movement of ram 30 causes anvil tip 106 to force the plastic insulation about the terminal of the wire conductor and the wire conductor itself, and forces the insulation and terminated conductor into the die base of the transducer tip. When ram 30 has reached its lowermost position, anvil tip 106 and transducer tip 96 have acted to force the plastic insulation around the terminated conductor and have applied considerable pressure to the insulation at those points where the insulation is to be welded. During the next half-revolution of cam 32, ram 30 is maintained in its lowermost position and the ultrasonic welding of insulation about the terminated conductor is carried out. This welding operation is performed by an ultrasonic generator that causes the transducer tip to vibrate at ultrasonic frequencies, i.e., frequencies of about 20 kilocycles to about 500 kilocycles. The ultrasonic vibration of the transducer tip creates a heating of the insulation at the points where pressure is applied to the insulation such as to cause the upper and lower portions of the insulation strip to weld together to form a unitary mass.

A raised segment on cam 32 causes the quick downward movement of spring loaded knives 68 and 106. Rear knife 106 severs the welded insulation from the strip of insulation while knife 68 is provided to cut out a notch-shaped piece of insulation. Further rotation of cam 32 allows the withdrawal of the spring loaded knives and the cam causes ram 30 to ascend. The insulated terminal is then removed and the welding cycle is repeated for a new terminated conductor. It will be understood that the raised segment on cam 32 could also be positioned on the periphery thereof to cause knives 68 and 106 to sever the insulation before the welding operation.

As will be understood by those skilled in the art, the preferred embodiment of the ultrasonic welding device of the present invention may be modified without departing from the scope of the present invention. Thus, other types of terminals may be insulated. In such cases, different forms of vinyl extrusions may be required. In addition, the vinyl feed mechanism, the vinyl positioning block, the transducer tip, the ram die and other mechanisms used to insure proper positioning and trimming of the insulated terminal at the weld station may also be modified if necessary.

Insulation material other than vinyl may also be used. Thus, other plastic insulation materials known to those skilled in the art may be used. In addition, plastic films with metallic depositions which are valuable for their shielding characteristics may also be welded by the ultrasonic generator of the present invention. Where it is desirable, thin ribbons of metal may also be welded.

Although a preferred embodiment of an ultrasonic welding device has been described hereinabove, it will be understood that other embodiments are within the scope of the present invention, and that therefore this invention should not be limited by the above description and drawings, but rather by the appended claims.

What is claimed is:

1. An ultrasonic welding device comprising a welding station, roll means for feeding forward an elongated U-shaped continuous strip of insulation material to said welding station, spreader means for spreading open a portion of the end of said strip of insulation, said spreader means being positioned near said welding station, reciprocatable ram pressure means for forming said insulation about at least a portion of a terminal positioned within the end of said insulation strip, ultrasonic welding means for welding said insulation about said portion of said terminal, said ram pressure means and said ultrasonic welding means defining said welding station, knife means for severing said insulation welded about said terminal from the remainder of said elongated strip of insulation material, drive means, cam follower means mounted on said ram means, and cam means linked to said drive means, said cam follower means being in operational engagement with said cam means and being driven thereby to cause said ram pressure means to reciprocate.

2. The ultrasonic welding device of claim 1 wherein said knife means includes means for removing excess insulation from said insulation welded about said terminal.

3. An ultrasonic welding device comprising a welding station, at least two oppositely disposed rolls adapted to feed forward an elongated U-shaped continuous strip of insulation material to said welding station, an insulation spreader, a reciprocatable ram, a forming tip mounted on said ram, an ultrasonic welder, a transducer tip disposed in opposed relationship to said forming tip, said forming tip and said transducer tip forming said welding station, said ultrasonic welder being connected to said transducer tip, a cam follower mounted on said ram, a cam, said cam follower being in operational engagement with said cam, and drive means connected to said cam for driving said cam and thereby for reciprocating said ram.

4. The ultrasonic welding device of claim 3 including a knife mounted on said ram.

5. An ultrasonic welding device comprising a welding station, a base plate, a frame mounted on said base plate, a vertically reciprocatable ram slidably mounted on said frame, oppositely disposed insulation feed rolls rotatably mounted on said frame for feeding forward an elongated U-shaped continuous strip of insulation material to said welding station, an insulation spreader movably mounted on said frame and linked to said ram, a forming tip mounted on one end of said ram, a source of ultrasonic energy mounted on said base plate, a transducer tip mounted on said source of ultrasonic energy and positioned in opposed relationship to said forming tip, said forming tip and said transducer tip defining said welding station, a first cam follower mounted on said ram, a cam rotatably mounted on said frame, said first cam follower being in operational engagement with said cam, a knife slidably mounted on said ram, a second cam follower connected to said knife and in operational engagement with said cam, and drive means for driving said cam and at least one of said feed rolls in such manner that rotation of said cam causes said ram to reciprocate and said feed rolls to advance said strip of insulation to said welding station.

6. The ultrasonic welding device of claim 5 including a second knife slidably mounted on said ram and connected to said second cam follower.

7. The ultrasonic welding device of claim 5 including a guide mounted on said ram for positioning wire leads with respect to said forming tip and said transducer tip.

8. An ultrasonic welding device comprising a base plate, a vertical frame mounted on said base plate, a reciprocatable ram slidably mounted on said frame, an insulation forming tip mounted on the end of said ram, a source of ultrasonic energy a portion of which is mounted on said base plate, a transducer tip mounted on said portion of said source of ultrasonic energy mounted on said base plate, said transducer tip being positioned in opposed relationship with respect to said forming tip, said forming tip and said transducer tip defining a welding station, a pair of oppositely disposed feed rolls journalled in said frame for feeding at least the end portion of a U-shaped strip of insulation material between said forming tip and said transducer tip, a guide block mounted on said frame for guiding said strip of insulation material, a spreader movably mounted on said frame adjacent said welding station for spreading open said end portion of said strip of insulation for positioning of at least a portion of an electrical terminal affixed to a wire lead therein, said spreader being linked to said ram and driven thereby and caused to move transversely of the longitudinal axis of said insulation strip, a cam journalled on said frame, said cam having a continuous groove in one face thereof, a first cam follower mounted on said ram, said first cam follower being adapted to ride in said groove of said cam, a knife slidably mounted on said ram and spring biased to a retracted position, a second cam follower connected to said knife and in operational engagement with the periphery of said cam, and drive means for causing said cam to rotate whereby rotation of said cam causes said ram to reciprocate and said knife to be extended beyond the end of said ram against said spring bias, said drive means causing said feed rolls to rotate.

9. An ultrasonic welding device for welding insulation about electrical terminals comprising reciprocatable pressure means, ultrasonic welding means disposed opposite said pressure means, said pressure means and said welding means defining a welding station, feed means for feeding forward an elongated continuous strip of insulation material a predetermined distance to said welding station, movable spreader means disposed adjacent said welding station for spreading open said insulation as said insulation strip is fed forward, means for positioning at least a portion of an electrical terminal within said spread-open insulation at said welding station, and control means for causing said pressure means in conjunction with said welding means to form said insulation about at least a portion of said electrical terminal and to ultrasonically weld said insulation so formed.

10. The ultrasonic welding device of claim 9 wherein said control means includes means for causing said spreader means to spread open said insulation means prior to insertion of said terminal means.

11. The ultrasonic welding device of claim 9 wherein said feed means is adapted to feed forward an elongated U-shaped continuous strip of insulation material a predetermined distance to said welding station and wherein said spreader means is movable transversely of said insulation strip to spread open said strip for insertion of said electrical terminal within said spread-open portion.

12. The ultrasonic welding device of claim 11 wherein said control means includes drive means for reciprocating said pressure means upwardly and downwardly, said drive means including means for causing said feed means to feed said insulation material forward said predetermined distance while said pressure means is moving upwardly, means for causing said spreader means to move transversely to an insulation opening position to spread open said insulation for insertion of a terminal therein as said pressure means moves upwardly and for said spreader to be withdrawn from said insulation opening position as said pressure means moves downwardly.

13. An ultrasonic welding device for welding insulation about electrical terminals comprising reciprocatable pressure means, ultrasonic welding means disposed opposite said pressure means, said pressure means and said welding means defining a welding station, feed "roll" means for feeding forward an elongated continuous strip of insulation material a predetermined distance to said welding station, movable spreader means disposed adjacent said welding station for spreading open said insulation as said insulation strip is fed forward to permit positioning of an electrical terminal within the insulation, and control means for causing said pressure means in conjunction with said welding means to form said insulation about at least a portion of an electrical terminal after said electrical terminal has been positioned within said spread-open insulation and to ultrasonically weld said insulation so formed.

References Cited

UNITED STATES PATENTS

| 2,606,412 | 8/1952 | Salfisberg | 53—28 |
| 3,123,431 | 3/1964 | Keller | 29—630 X |
| 3,193,169 | 7/1965 | Arnold | 228—1 |
| 3,254,402 | 6/1966 | Balamuth et al. | 29—470 |
| 2,803,695 | 8/1957 | Wolley. | |
| 3,164,861 | 1/1965 | Munroe et al. | 29—203 X |
| 3,238,079 | 3/1966 | Mitchell et al. | 156—267 X |

JOHN F. CAMPBELL, *Primary Examiner.*

RICHARD BERNARD LAZARUS, *Assistant Examiner.*

U.S. Cl. X.R.

156—580; 264—23, 162